United States Patent [19]

Burge et al.

[11] Patent Number: 5,389,144
[45] Date of Patent: Feb. 14, 1995

[54] ADMIXTURE FOR SPRAY CONCRETE AND MORTAR AND A METHOD FOR THE MANUFACTURE OF SPRAY CONCRETE AND MORTAR USING THIS ADMIXTURE

[75] Inventors: Theodor A. Burge, Geroldswil; Gustav Bracher, Rifferswil; Dieter Mai, Bilten, all of Switzerland

[73] Assignee: Sika AG vorm. Kaspar Winkler & Co., Zurich, Switzerland

[21] Appl. No.: 901,117

[22] Filed: Jun. 19, 1992

[30] Foreign Application Priority Data

Jun. 21, 1991 [CH] Switzerland ............ 1848/91
Jul. 23, 1991 [CH] Switzerland ............ 1848/91

[51] Int. Cl.⁶ ............................................ C04B 22/00
[52] U.S. Cl. ...................... 106/737; 106/740; 106/743; 252/88
[58] Field of Search .............. 252/88; 106/721, 737, 106/743, 740, 819

[56] References Cited

U.S. PATENT DOCUMENTS 4,504,315 3/1985 Allemann et al. ............ 106/315
4,772,327 9/1988 Allemann et al. ............ 106/737
5,149,370 9/1992 Olaussen et al. ............ 106/737

Primary Examiner—Mark L. Bell
Assistant Examiner—Paul Marcantoni
Attorney, Agent, or Firm—Burns, Doane, Swecker & Mathis

[57] ABSTRACT

Admixtures for spray concrete or mortar which contain silicic acid sol or consist of it, are used for the processing of spray concrete or mortar according to the dry or the wet method. Said admixtures lead to a clear reduction of dust formation and of rebound. With the processing of spray concrete or mortar the addition of the inventive admixtures takes place preferably during the spraying, for example at the spray nozzle.

21 Claims, No Drawings

ADMIXTURE FOR SPRAY CONCRETE AND MORTAR AND A METHOD FOR THE MANUFACTURE OF SPRAY CONCRETE AND MORTAR USING THIS ADMIXTURE

BACKGROUND OF THE INVENTION.

It was the goal of the present invention to develop an admixture for spray concrete and spray mortar which makes it possible to reduce dust formation and rebound when processing the spray concrete and mortar according to the dry or wet method. It was found unexpectedly that these goals can be achieved with an admixture which containing silicic acid sol.

DESCRIPTION OF THE PRIOR ART

Silicic acid sols are well known in the art. They are aqueous colloidal dispersions of amorphous silicon dioxide ($SiO_2$) where the silicon dioxide is present in the form of not crosslinked spherical individual particles having hydroxy groups on their surface.

With regard to the physical and chemical properties of silicic acid sols and the methods for their production, reference is made to Ullman's Encyclopedia of Technical Chemistry, 4th edition, volume 21, pages 456–458.

It is already known to add amorphous silicon dioxide as a powder or as an aqueous dispersion during the production of concrete, particularly to increase the compressive strength of the concrete and to reduce the penetration of aqueous solutions into the concrete. The amorphous silicon dioxide is generally added as Silica fume, which is a byproduct of the production of silicon metal and silicon alloys. The corresponding Silica fume consists of particles of rapidly cooled smoke gases which precipitate on electrofilters. This Silica fume or fly ash differs in chemical composition and particle size, from fly ashes obtained from thermal power plants which for a long time were used as cement additives. Silica fume usually contains more than 80% of $SiO_2$ and its combustible fraction is lower than 1%. The material contains amorphous flint glass, and the spherical shape of the particles is visible under the electron microscope. The particle diameters are less than 0.2 $\mu$m. The specific surface if determined by absorption according to Brunauer, Emmet and Teller, generally is in the range of 15 to 30 $m^2/g$.

It is already known to add Silica fume when spray concrete or spray mortar is manufactured to achieve better properties of the prepared products. Thereby, it is necessary to add Silica fume powder in an amount of 5%–10%, and Silica fume slurry in an amount of 10%–20%, based on the weight of the cement contained in the spray mortar or spray concrete in order to achieve the desired properties.

These large amounts of additive make storage, as well as transportation and the addition to concrete rather difficult. Silica fume powders also increase the dust formation during the spraying procedure. Contrary to this, the addition of Silica fume slurries does not essentially alter the dust formation during spraying, if compared to spraying performed without the additive. However, when Silica fume slurries are added there occurs an exceptionally large abrasion of the equipment, for example, the abrasion of pumps, dispenser pumps, spray nozzles, etc.

SUMMARY OF THE INVENTION

It was surprisingly found that the above mentioned disadvantages which are to be found with the addition of Silica fume in the form of a corresponding powder or a corresponding slurry, during the production of spray concrete and mortar, can be avoided by adding an admixture which contains silicic acid sol or which consists of silicic acid sol. It was surprisingly found out that with the aid of said admixture dust formation and the rebound can be reduced when spray concrete or spray mortar is processed according to the dry method or according to the wet method.

Accordingly, one object of the present invention is to provide an admixture for spray concrete and mortar, wherein said admixture reduces dust formation and rebound during the processing of spray concrete and mortar according to the dry or wet method, and wherein said admixture contains silicic acid sol.

A further object of the present invention is a method for the manufacturing of spray concrete and spray mortar according to the dry or wet method, wherein there is added an admixture which contains silicic acid sol.

DETAILED DESCRIPTION OF THE PREFERRED EMBODIMENTS

It is well known in the art that silicic acid sols are relatively unstable systems and that they can be converted into a gel by adding electrolytes or by changing the pH value. It is believed that the unexpected advantages which are encountered when the admixtures of the present invention are added during the manufacturing of spray concrete and spray mortar, are achieved due to said gel formation.

Because of its instability and its extra-ordinary fineness, silic acid sol is highly reactive. It is assumed that it reacts rapidly with calcium hydroxide which is formed in the course of the cement hydratation. Spray concrete and mortar furthermore have high pH-values, which generally are in the vicinity of 13. The high pH-values and also the presence of the calcium ions in the spray concrete and the spray mortar, probably also contribute to the fact that gelatinizing of silicic acid sol occurs immediately when the admixtures according to the present invention are added.

It is known that a hardening retardation is to be observed when normal fly ash is added to concrete compositions. Surprisingly, in contrast to this, the admixtures according to the present invention which contains silicic acid sol or consists thereof, lead to no hardening retardation when added to spray concrete and mortar.

It was found that with the production of spray concrete and mortar with the addition of the admixtures according to the present invention, fine particles are bound in the spray concrete or in the mortar, and that a considerable reduction of dust formation is achieved.

Another advantage which can be achieved with the admixtures according to the present invention, is that the bond between the individual particles is increased. Due to this, it is possible to apply single, extremely thick layers in one layer without adding set-accelerators.

It is well known in the art to apply spray concrete, either according to the wet method or according to the dry method. In the case of the wet method, a mixture of cement and aggregate with water is sprayed onto the tunnel wall or another substrate with the aid of a jet. In the case of the dry method, the components are conveyed dry to the nozzle where water is added. A faster setting is generally achieved with the dry method.

Both methods are used to an increasing extent in concrete and construction restoration.

For practical reasons, for example in order to maintain a constant quality, the wet method has proven itself more and more in the last few years. The finished mixed concrete and mortar can be produced at the construction site or it can be supplied from a concrete ready mix plant. To achieve a good processing capability as well as to assure the potential for longer processing time, generally known concrete admixtures can be added at the ready mix plant. These include water-reducers, high-range water-reducers, retarders, air entraining agents and aqueous polymer dispersions.

The admixtures according to the invention preferably contain an aqueous silicic acid sol or they consist of an aqueous silicic acid sol. Preferably, the silicic acid sol and the preferred aqueous silicic acid sol have a particle size in the range of 7–50 nm, preferably 7–40 nm, and a specific surface of 50–700 $m^2/g$, specially preferred 80–500 $m^2/g$.

The admixtures according to the present invention on the basis of silicic acid sols generally exhibit a silicon dioxide content, based on the weight of the silicic acid sol, in the range of 5–60% by weight, preferably in the range of 15–50% by weight.

When the spray concrete and mortar is produced according to the dry method or the wet method, the addition of the admixtures according to the invention preferably takes place right before or during the spraying of the spray concrete or mortar, and preferably the admixture is introduced at the nozzle or into the spray nozzle. The inventive admixture, for example, can be added using a dispensing pump.

Preferably, the inventive admixture is added in an amount of from 0.1–100% by weight, preferably 2–20% by weight, based on the weight of the binding agent contained in the spray concrete or spray mortar.

The admixtures according to the present invention can be added to such spray concrete compositions or spray mortar compositions, which contain as additional component(s) at least one constituent which is selected from the group of following constituents:

water-reducers, high-range water-reducers, retarders, air entraining agents and aqueous polymer dispersions.

The admixtures according to the present invention can be also premixed with one or several of the above mentioned constituents.

With the production of spray concrete or mortar, it may be advantageous to add a powdery or a liquid setting accelerator in addition to the inventive admixtures. The accelerator is preferably added directly before or during the spraying of the concrete. Liquid setting accelerators are preferably added with a dispensing pump at the spray nozzle. If the addition of the admixture according to the present invention is done with a dispensing pump, then the setting accelerator is generally conveyed with a separate dispensing pump.

It was found out that the combined addition of an admixture according to the present invention with a setting accelerator leads to specially advantageous results, because the setting accelerators are electrolytes with a high pH-value, and they promote the gelation of the silicic acid sol. The combined addition of silicic acid sol and the setting accelerator leads to an increase in the strength of the applied spray concrete.

The following examples will explain the present invention in more detail.

In all examples, a mortar mixture was used which contained 1440 kg of sand, 0–8 mm and 350 kg Portland cement (Type I).

The setting accelerators on an aluminate basis were products of the trademark designation "Sigunit" of Sika AG. The setting accelerators were added in the given percentages, calculated by weight of the Portland cement present in the mortar mixture. In experiments 1 and 4, 5% of the powder setting accelerator "SIGUNIT-Powder" were added to the dry mixture. In test 2, 5% of the liquid setting accelerator "SIGUNIT-L62" was added to the spray nozzle.

The admixture according to the present invention was added at the spray nozzle in tests 3 and 4.

The admixture according to the invention used in these experiments was an aqueous silicic acid sol which had a silicon dioxide content of 35% by weight. In tests 3 and 4, 5% by weight of this 35% sol was added, by the cement weight.

Silica fume powder was added to the dry mixture and the Silica fume slurry at the spray nozzle.

A concrete spray machine type ALIVA 246 was used with a 3.6 l rotor, a conveyor hose with 38 mm diameter and a normal spray nozzle. The air pressure amounted to 2.5 bar. Dust measurements were carried out during the spraying. The rebound was measured and after conclusion of the experiment determined by weighing.

Dust measurement was done according to the method of dust measurement in mining operation, dust measurement and sampling with the equipment MPG II of the company Wazau, Berlin 36, Dresdnerstrasse 11.

The determination of rebound was done vertically and overhead.

After 24 hours, cores were drilled from the hardened spray mortar and the compressive strength was determined after different times.

In addition to tests 1–4, further experiments were carried out, where instead of the silicic acid sol, or instead of the setting accelerator, 15% Silica fume slurry, or 12% of Silica fume powder was added. The values obtained with these tests and tests 1–4 are stated in the following tables:

TABLE I

| Dust formation | |
|---|---|
| | Fine dust < 5 μm in mg/m³ air |
| Test | |
| 1 | 8.4 |
| 2 | 6.1 |
| 3 | 2.4 |
| 4 | 3.4 |
| Silica fume slurry (15% dosage) | 6.7 |

TABLE II

| Rebound | | |
|---|---|---|
| | % Wt. of sprayed material | |
| | Vertical | Overhead |
| Test | | |
| 1 | 12 | 23 |
| 2 | 11 | 22 |
| 3 | 2 | 5 |
| 4 | 3 | 5 |
| Silica fume powder (12% dosage) | 16 | 31 |

TABLE II-continued

| | Rebound | |
|---|---|---|
| | % Wt. of sprayed material | |
| | Vertical | Overhead |
| Silica fume slurry (15% dosage) | 9 | 18 |

TABLE III

Determination of compressive strength, 24 hours or 7 days after spraying.

| | MPa after | |
|---|---|---|
| | 1 day | 7 days |
| Test | | |
| 1 | 18.6 | 25.8 |
| 2 | 22.0 | 29.7 |
| 3 | 20.9 | 33.0 |
| 4 | 24.1 | 41.9 |
| Silica fume slurry (15% dosage) | 18.4 | 40.1 |

It is seen from the values given in Tables I and II that much more dust is formed with the powdery, or liquid setting accelerators and rebound is much higher than with the addition of the admixture according to the invention on the basis of silicic acid sol. The combined addition of the admixture according to the invention with the same powdery setting accelerators leads to very good values.

It is seen further from Tables I and II that the Silica fume, added as powder or slurry, is not capable of reducing the dust formation or rebound and thus shows a completely different effect than the admixture according to the invention on the basis of silicic acid sol.

The results of Table III further show that with the addition of silicic acid sol alone, better compressive strengths after 1 and 7 days are obtained than with the sole addition of the powdery setting accelerator. Further, a comparison with the liquid setting accelerator shows that the admixture according to the invention on the basis of silicic acid sol furnishes higher compressive strength after seven days than the liquid setting accelerator.

The best results with regard to the compressive strength after 1 day and after seven days are obtained by the combined addition of powdery accelerators plus the inventive admixture which is on the basis of silicic acid sol.

What is claimed is:

1. A method for controlling dust formation and rebound in the processing of spray concrete or spray mortar, comprising the addition of an admixture consisting of an aqueous silicic acid sol or the addition of an admixture comprising an aqueous silicic acid sol to the concrete or mortar, wherein said addition of the admixture is in an amount effective to reduce dust formation and rebound in the processing of spray concrete or spray mortar.

2. A method according to claim 1, further comprising converting said silicic acid sol to a gel after adding the admixture to the spray concrete or spray mortar.

3. A method according to claim 1, wherein the added aqueous silicic acid sol has a particle size in the range of 7 to 50 nm and a specific surface area of 50 to 700 m²/g.

4. A method according to claim 3, wherein the aqueous silicic acid sol has a specific surface area of 80 to 500 m²/g.

5. A method according to claim 1, wherein the silicic acid sol has a silicon dioxide content of 5 to by weight, based on the weight of said silicic acid sol.

6. A method according to claim 5, wherein the silicic acid sol has a silicon dioxide content of 15 to 50% by weight.

7. A method according to claim 1, wherein the addition is that of the admixture which consists of an aqueous silicic acid sol.

8. A method according to claim 1, wherein the admixture is added immediately before or during spraying of the spray concrete or mortar.

9. A method according to claim 8, wherein the admixture is added by introducing the additive or admixture into the spray nozzle where it is contacted with spray concrete or mortar.

10. A method according to claim 9, wherein the admixture is introduced with a dispensing pump.

11. A method according to claim 1, wherein the spray concrete or spray mortar comprises an agent effective for binding and the admixture is added in an amount of from 0.1 to 100% by weight, based on the weight of said agent contained in the spray concrete or spray mortar.

12. A method according to claim 1, wherein the spray concrete or spray mortar further comprises at least one member selected from the group consisting of water reducers, high-range water reducers, retarders, air entraining agents and aqueous polymer dispersions.

13. A method according to claim 1, wherein the admixture comprises an aqueous silicic acid sol and further comprises at least one component selected from the group consisting of water reducers, high-range water reducers, retarders, air entraining agents and aqueous polymer dispersions.

14. A method according to claim 1, wherein a powderous or liquid setting accelerator is added during production of the spray concrete or mortar.

15. A method according to 14, wherein a setting accelerator is added to the spray concrete or mortar just before or during the spraying of the concrete or mortar.

16. A method according to claim 10, wherein the admixture is introduced into the spray nozzle with a dispensing pump, and further comprising adding a liquid setting accelerator by introducing the setting accelerator into the spray nozzle using a separate dispensing pump.

17. The admixture for spray concrete and mortar in the method according to claim 1, said admixture consisting of an aqueous silicic acid sol or said admixture comprising an aqueous silicic acid sol, wherein said admixture is effective to reduce dust formation and rebound during the processing of spray concrete and mortar according to a dry or wet method.

18. An admixture according to claim 17, said aqueous silicic acid sol having a particle size in the range of 7 to 50 nm and a specific surface area of 50 to 700 m²/g.

19. An admixture according to claim 18, said aqueous silicic acid sol having a specific surface area of 80 to 500 m²/g.

20. An admixture according to claim 17, said aqueous silicic acid sol having a silicon dioxide content of 5 to 60% by weight, based on the weight of said silicic acid sol.

21. An admixture according to claim 20, wherein the aqueous silicic acid sol has a silicon dioxide content of 15 to 50% by weight.

* * * * *